United States Patent Office 3,096,614
Patented July 9, 1963

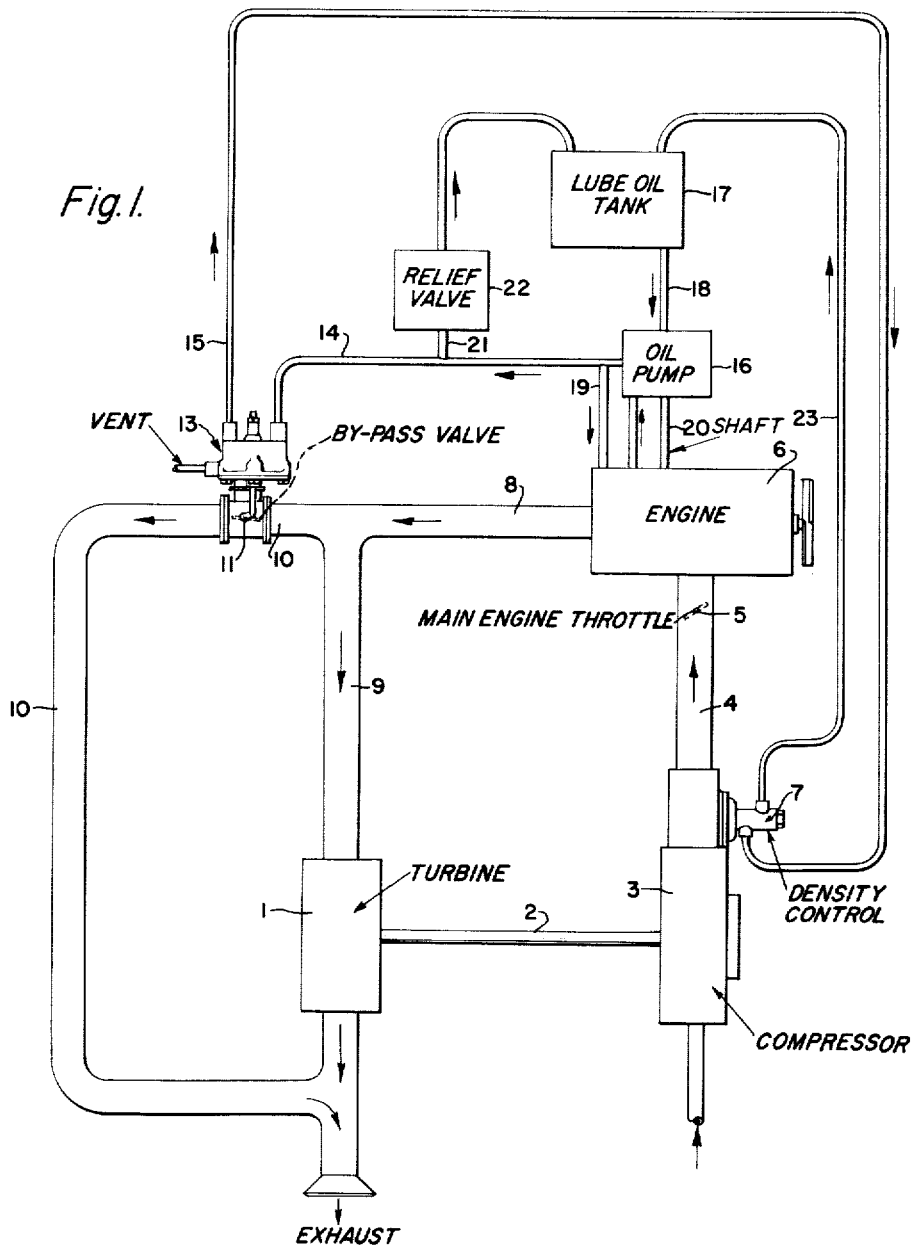

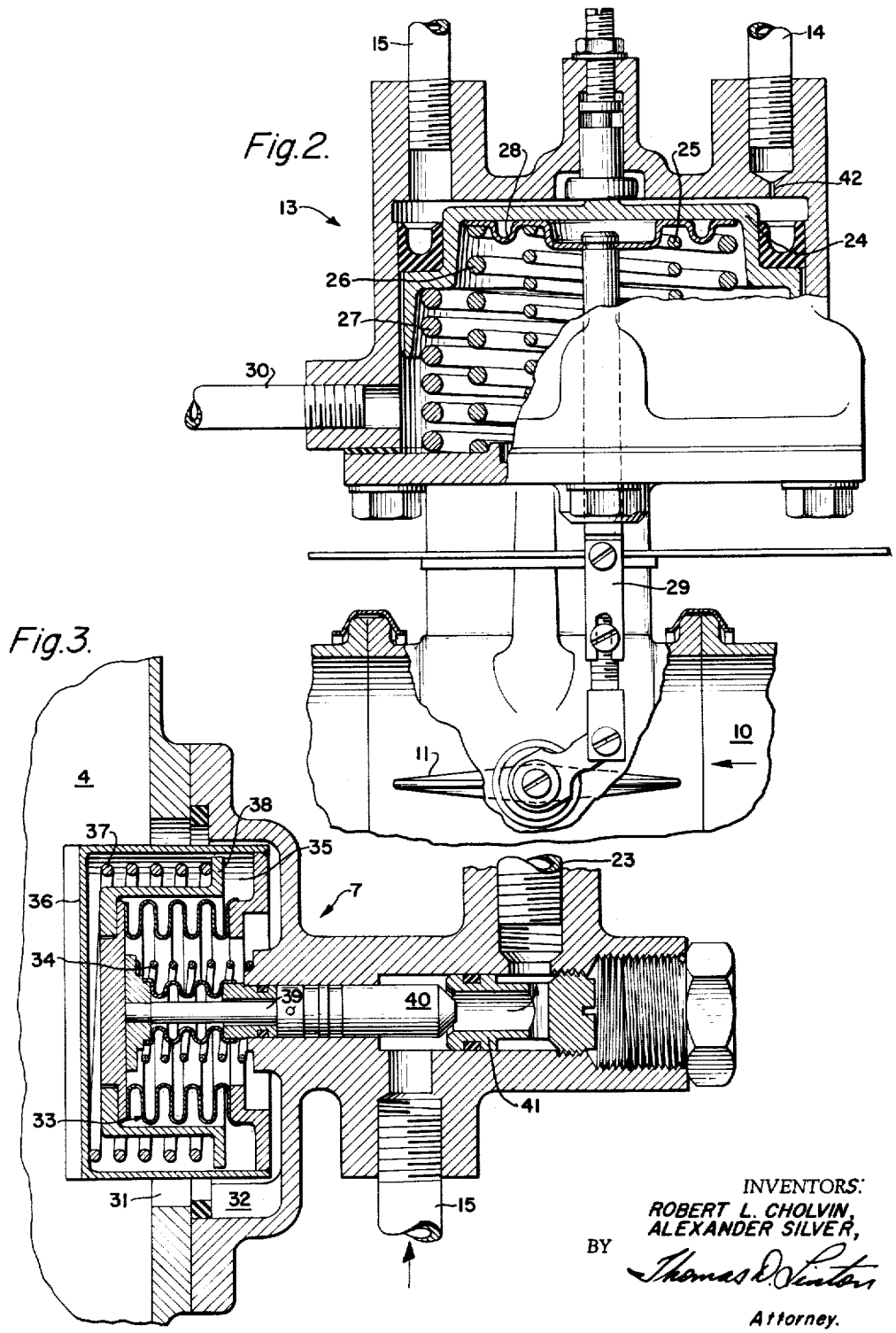

---

3,096,614
TURBO-CHARGER BOOST DENSITY CONTROL
Alexander Silver, East Woodland Hills, and Robert L. Cholvin, El Segundo, Calif., assignors to The Garrett Corporation, Los Angeles, Calif., a corporation of California
Filed Mar. 29, 1961, Ser. No. 99,099
10 Claims. (Cl. 60—13)

This invention relates to a turbocharger boost density control wherein the density of air discharged from a turbocharger compressor is controlled in accordance with absolute pressure and absolute temperature sensed at the compressor discharge. In particular, this control system provides for the maintenance of sea level air density or other predetermined density for air supplied to an internal combustion engine so as to insure constant horsepower output from the internal combustion engine at varying altitudes and ambient temperature conditions.

Accordingly, an important object of this invention is to provide for a turbocharger boost density control wherein absolute pressure and absolute temperature of compressor discharge air is sensed and the supply of air to an internal combustion engine is controlled so as to maintain a predetermined pressure-temperature relationship established for air supplied to the engine.

Another object of the invention is a control in accordance with the initial object wherein engine exhaust gases are utilized to operate a turbine which drives a compressor unit supplying air to an internal combustion engine.

A further object of the invention is a control in accordance with the initial object having a by-pass valve assembly so situated that engine exhaust gases utilized for operating a turbine may be by-passed around the turbine and thus control turbine operational speed.

Still another object of the invention is a control in accordance with the initial object having a by-pass valve actuating assembly operated by hydraulic pressure so that movement of the by-pass valve is controlled in accordance with variations of hydraulic pressure acting on the actuating assembly.

A still further object of the invention is a control in accordance with the initial object in which variations in hydraulic pressure acting on the actuating assembly are controlled in accordance with variations from a predetermined pressure-temperature relationship established for air supplied to an internal combustion engine.

Another object of the invention is a control in accordance with the initial object having a pressure-temperature sensing unit for sensing variations from a predetermined pressure-temperature relationship established for air supplied to an internal combustion engine.

A further object of the invention is a control in accordance with the initial object having a valve assembly operated by the pressure-temperature sensing unit so that variations in the effect of hydraulic pressure acting on the by-pass valve actuating assembly are controlled in accordance with variations from a predetermined pressure-temperature relationship established for air supplied to an internal combustion engine.

Still another object of the invention is a control in accordance with the initial object having a pressure-temperature sensing unit capable of detecting variations from a predetermined pressure-temperature relationship established for air supplied to an internal combustion engine.

That these and other objects and advantages of the invention are attained will be readily apparent from a consideration of the following description when taken in conjunction with the drawings, in which:

FIG. 1 is a schematic diagram of the turbocharger boost density control system.

FIG. 2 is a partial cross-sectional view of the by-pass valve actuating assembly with portions shown in elevation; and FIG. 3 is a sectional view of the pressure-temperature sensing unit.

Referring to FIG. 1 of the drawings, numeral 1 designates a turbine of conventional design connected by shaft 2 to a compressor unit 3. Compressor 3 is driven by turbine 1 through shaft connection 2. Compressed air discharged from compressor 3 passes through conduit 4, past the main engine throttle valve 5 and then enters the intake manifold of an internal combustion engine 6. Attached to the discharge end of compressor unit 3 is a pressure-temperature sensing unit 7. Details of the sensing unit 7 are shown in sectional view by FIG. 3.

Internal combustion engine exhaust gases are conveyed through exhaust conduit 8. Conduit 8 connects with turbine inlet conduit 9 so that engine exhaust gases may flow into turbine unit 1 and therein transfer energy so as to operate the turbine unit 1.

Also connected to engine exhaust conduit 8 is an exhaust gas by-pass conduit 10. Situated within conduit 10 is an exhaust gas by-pass valve 11. Valve 11 regulates the flow of engine exhaust gases through by-pass line 10. When valve 11 is fully opened a considerable quantity of engine exhaust gas is by-passed around the turbine 1. The degree of actuation of valve 11 determines the amount of engine exhaust gases transmitted to turbine unit 1. In this manner the operational speed of the turbine 1 is controlled.

By-pass valve 11 is actuated by a valve actuating assembly 13. Actuating assembly 13 is operated by the hydraulic pressure of fluid flowing through inlet conduit 14 and outlet conduit 15. Hydraulic fluid is supplied to assembly 13 by oil pump 16. The source of supply for fluid circulated by pump 16 is the lubricating oil retained in lubricating oil tank 17. Pump 16 circulates oil from tank 17 through conduit 18 and thence oil is discharged through conduit 14 into the actuating assembly 13. Lubricating oil circulated by pump 16 also flows through a conduit 19 into the engine 6 so as to supply lubricant for the internal combustion engine 6. Pump 16 is operated by engine 6 through shaft coupling 20.

A conduit 21 connects fluid conduit 14 with a relief valve 22. Relief valve 22 is provided to insure the safe operation of actuating device 13. In the event pump 16 develops a predetermined high discharge pressure, relief valve 22 is actuated so that a portion of the flow of lubricating oil in conduit 14 is diverted through relief valve 22 and thence discharged into lubricating oil tank 17. Details of the actuating assembly 13 are shown in cross sectional view by FIG. 2.

Sensing unit 7 controls the operation of actuating unit 13 by restricting the flow of hydraulic fluid through conduit 15 as will be more fully described hereinafter. Hydraulic fluid flowing from sensing unit 7 passes through conduit 23 into the lubricating oil tank 17.

Referring to FIG. 2 wherein is shown the actuating assembly 13, it is seen that hydraulic fluid flowing through inlet conduit 14 exerts pressure on a piston 24. Fluid flowing into assembly 13 exhausts through the outlet conduit 15. Fluid pressure acting on piston 24 is opposed by the combined forces exerted by resilient springs 25, 26 and 27 mounted within actuating assembly 13. As hydraulic pressure increases within actuating unit 13 pressure is exerted on the piston 24 tending to oppose the combined spring forces exerted by spring members 25, 26 and 27 acting against plate member 28. If the hydraulic pressure overcomes spring tension within the actuating assembly 13, an actuating arm 29 is operated so as to change the position of the bypass valve 11. As hydraulic pressure within actuating unit 13 decreases the bypass valve 11 is moved to a more open position thereby allowing a greater volume of exhaust gases to be by-passed around turbine 1 and thence be exhausted into the atmosphere.

Numeral 30 designates a vent connection for actuating unit 13. Vent 30 permits atmospheric pressure to be maintained within actuating unit 13 at all times during the operation of the control system. Since the air flowing into compressor 3 is at atmospheric pressure, the vent connection 30 insures that the air pressure within assembly 13 corresponds with the pressure of air delivered to compressor 3.

Referring to FIG. 3 wherein is shown a sectional view of sensing unit 7, it is seen that compressed air discharged from compressor unit 3 communicates with the interior of the sensing unit 7. Compressed air from compressor 3 passes into conduit 4, through ports 31 and 32 into the interior of bellows 33. Included within bellows 33 is a follower spring 34. An enclosed volume 35 is formed by the exterior portions of bellows 33 and the casing structure 36 which encloses the sensing unit 7. The enclosed volume 35 is filled with dry nitrogen gas, or the like, so that variations in the temperature of compressed air discharged from compressor 3 will be reflected by a corresponding change in temperature conditions within the enclosed volume 35. Thus pressure conditions existing within the enclosed volume 35 will vary as a function of the temperature of compressed air discharged from compressor unit 3.

Also included within the enclosed volume 35 is a spring member 37 which is mounted so as to encircle the bellows 33. The resilient force exerted by spring member 37 against a mounting member 38 normally tends to compress the bellows structure. Pressure within bellows 33 combined with the resilient forces exerted by spring member 34 and bellows 33 is opposed by a predetermined charge pressure existing within the enclosed volume 35. Thus, it is seen that a condition of pressure balance is maintained within bellows 33 when the charge pressure existing in volume 35 is equal to the sum of the internal pressure within bellows 33 and the pressure resulting from the net resilient forces exerted by the resilient spring members. When an unbalanced condition between pressures externally of bellows 33 and pressures internally thereof exist, movement of the actuating arm 39 thereby results. For example, when the pressure within volume 35 exceeds the pressure within the interior of bellows 33, actuating arm 39 is caused to move to the right as viewed in FIG. 3. Conversely, when pressure within bellows 33 exceeds pressure within volume 35, actuating arm 39 is caused to move to the left as viewed in FIG. 3.

A valve element 40 is attached to the actuating arm 39. Element 40 and valve seat member 41 form a control valve within the sensing unit 7 whereby hydraulic pressure communicating with actuating unit 13 is controlled. When actuating arm 39 is moved to the right as viewed in FIG. 3, member 40 approaches seat 41 so as to restrict the flow of hydraulic fluid flowing from conduit 15 into conduit 23. When member 40 is fully seated upon member 41 the flow of hydraulic fluid from the actuating unit 13 is completely obstructed. The unseating of valve member 40 permits flow of hydraulic fluid from actuating unit 13 through conduit 15, sensing unit 7, pump 16 and conduit 14. Hydraulic fluid flowing in conduit 14 passes through an orifice 42. The restricting action produced by orifice 42 on the flow of fluid in conduit 14 causes a reduction in pressure on the discharge side of said orifice, thereby reducing pressure acting on piston 24. Thus it can be seen that the position of member 40 with respect to the valve seat 41 controls the movement of actuating arm 29 within the actuating unit 13 thereby controlling the position of bypass valve 11.

As will be apparent to those skilled in the art an explanation of the operation of the sensing unit 7 may be had by an examination of the relationships of pressures, temperatures, bellows area and spring forces as outlined hereinafter.

The mathematical equations for defining the operational basis for the sensing unit 7 may be defined by using symbols as listed below:

$P_{X0}$ = charge pressure (i.e., external pressure on the bellows at charging temperature $T_{X0}$)

$T_{X0}$ = charge temperature (i.e., temperature of bellows when charged to pressure $P_{X0}$)

$P_{C2}$ = compressor discharge pressure as sensed by the bellows $T_{C2}$ = compressor discharge temperature as sensed by the bellows $P_X$ = charge pressure at any value of temperature $T_{C2}$ (i.e., external pressure on the bellows at any temperature $T_{C2}$)

$A_B$ = bellows areas $F_S$ = net spring force $$K = \frac{P_{X0}}{T_{X0}} \text{ a constant}$$

$$C = \frac{F_S}{A_B} \text{ a constant}$$

When the sensing unit 7 is in operation the forces acting on the sensing bellows 33 must be balanced. The forces acting on the bellows are as follows:

$$P_{C2} \times A_B - P_X A_B \pm F_S = 0$$

By transposing:

$$P_{C2} = P_X \pm \frac{F_S}{A_B}$$

By the basic concepts of Charles Law, at constant volume, the ratio of bellows charge pressure $P_X$ to any value of temperature $T_{C2}$ is equal to the ratio of the charge pressure $P_{X0}$ to charge temperature $$T_{X0} \text{ or } P_X = \frac{P_{X0}}{T_{X0}} \times T_{C2}$$

By substitution:

$$P_{C2} = \frac{P_{X0}}{T_{X0}} \times T_{C2} \pm \frac{F_S}{A_B}$$

It is to be understood that the sign of the net spring force $F_S$ depends on the charge pressure and the initial calibration adjustments made on sensing unit 7.

If the volume 35 around bellows 33 is fully evacuated then $P_{X0}$ is equal to zero and the unit 7 maintains $$P_{C2} = \frac{F_S}{A_B}$$

Thus the unit 7 holds compressor discharge pressure to a constant absolute value depending on the net spring force $F_S$. The value $F_S$ may be adjusted to a predetermined value as required for particular operating characteristics of the control system.

If the volume 35 around bellows 33 is charged to a pressure equal to the desired discharge pressure $P_{C2}$ at the charged temperature $T_{X0}$ and the net spring force $F_S$ is adjusted to zero, then the unit 7 will maintain the following relationship:

$$\frac{P_{C2}}{T_{C2}} = \frac{P_{X0}}{T_{X0}}$$

this value being a constant. Thus the sensing unit 7 thereby becomes a constant density control unit.

From the herein described operation of the control system it readily can be seen by those skilled in the art that various sensitivities to temperature may be obtained, these sensitivities being dependent upon the value of charge pressure $P_{X0}$. If, for example, it were desired to operate the control system so that the turbocharger discharge pressure-temperature relationship would be such that $$\frac{P_{C2}}{\sqrt{T_{C2}}} = \text{a constant}$$

it would be apparent that the control system could not maintain directly a non-linear function such as imposed by this requirement. However, a straight line control function for this control can be established which closely approximates the non-linear functional control desired over the actual operating range of compressor discharge temperature.

Although this control system is of the simple servo form requiring some droop to fully stroke the bypass valve 11 and further, the system is subject to effects of expansion and contraction of the metal bellows end plates and internal vibration damping oil, the control system as described herein operates within small variable tolerances and maintains a close and accurate control over the operational functions of the turbocharger system.

It will be apparent to those skilled in the art that the novel principles of the invention disclosed herein will suggest various other modifications and applications of the same and that sections of the hydraulic system as described herein may be replaced with equivalent electrical circuitry or pneumatic systems, for example. It is accordingly desired that the present invention shall not be limited to the specific embodiment thereof described herein.

Having thus described our invention, we claim:

1. A turbocharger boost density control for an internal combustion engine wherein said engine is supplied with air from a compressor operated by a fluid turbine driven by gases exhausted from said internal combustion engine, said control comprising: means responsive to variations from a predetermined pressure-temperature relationship in air supplied to an internal combustion engine; means actuated by said responsive means for producing an impulse signal in accordance with the response produced in said responsive means; a valve providing a vent to atmosphere for gases exhausted from said internal combustion engine; means operated by said signal producing means for actuating said valve so as to vent gases exhausted from said internal combustion engine to the atmosphere thus controlling the operational speeds of said turbine and compressor whereby a predetermined pressure-temperature relationship is maintained in air supplied to said internal combustion engine.

2. A turbocharger boost density control in accordance with claim 1 wherein said responsive means includes a bellows having its interior volume in fluid communication with air discharged from said compressor; and means hermetically sealing a volume exterior to said bellows so that a predetermined pressure may be established within the hermetically sealed volume.

3. A turbocharger boost density control for an internal combustion engine wherein said engine is supplied with air from a compressor operated by a fluid turbine driven by gas exhausted from said internal combustion engine, said control comprising: a sensing unit responsive to variations from a predetermined pressure-temperature relationship in air supplied to an internal combustion engine; a first valve means, said first valve means being actuated by said responsive means; means for supplying hydraulic pressure to said first valve means; a second valve means, said second valve means providing a vent to atmosphere for gases exhausted from said internal combustion engine; means operated by hydraulic pressure for actuating said second valve means; means for transmitting variations in hydraulic pressure between said first valve means and said second valve actuating means, said first valve means being actuated by said responsive means so as to vary the hydraulic pressure between said first valve means and said second valve actuating means in order to operate said second valve means in accordance with variations from a predetermined pressure-temperature relationship in air supplied to said internal combustion engine.

4. A turbocharger boost density control in accordance with claim 11 wherein said second valve actuating means includes a piston responsive to variations in hydraulic pressure between said first valve means and said second valve actuating means; resilient means mounted within said piston producing a unidirectional force opposing movement of said piston in one direction; and an actuator arm operatively connected to said piston so as to translate movement thereof to said second valve means.

5. A turbocharger boost density control in accordance with claim 1 wherein said responsive means includes a resilient member responsive to varying pressure conditions and an actuating arm attached to said resilient member so as to follow movement of said resilient member.

6. A turbocharger boost density control in accordance with claim 1 wherein said means actuated by said responsive means includes, first and second members whose relative position to each other produces variations in the impulse signal supplied for operating said valve venting gases exhausted from said internal combustion engine to the atmosphere.

7. A turbocharger boost density control in accordance with claim 1 wherein said valve actuating means includes a reciprocating member responsive to variations in the signal impulse transmitted by said impulse signal means; means exerting a unidirectional force so as to oppose movement of said reciprocating means in one direction and an actuating member attached to said reciprocating means so as to follow the movement thereof.

8. In an engine supercharging system of the type wherein a turbine driven by gases exhausted from the engine operates a compressor for providing boost pressure to the induction air supplied to said engine, a boost pressure control comprising: means responsive to variations from a predetermined pressure-temperature relationship in air supplied to said engine; means actuated by said responsive means for producing an impulse signal in accordance with the response produced in said responsive means; means for altering the flow of exhaust gases from said engine to said turbine so as to vary the pressure of air supplied to said engine; and means operated by said signal producing means for actuating said flow altering means whereby the operational speeds of said turbine and compressor are controlled so that a predetermined pressure-temperature relationship is maintained in air supply to said engine.

9. In an engine supercharging system of the type wherein a turbine driven by gases exhausted from the engine operates a compressor for providing boost pressure to the induction air supplied to said engine, a boost pressure control comprising: single means responsive to variations from a predetermined pressure-temperature relationship in air supplied to said engine; means actuated by said responsive means for producing an impulse signal in accordance with the response produced in said responsive means; means for altering the flow of exhaust gases from said engine to said turbine so as to vary the pressure of air supplied to said engine; and means operated by said signal producing means for actuating said flow altering means whereby the operational speeds of said turbine and compressor are controlled so that a predetermined pressure-temperature relationship is maintained in air supply to said engine.

10. In an engine supercharging system of the type wherein a turbine driven by gases exhausted from the engine operates a compressor for providing boost pressure to the induction air supplied to said engine, a boost pressure control comprising: a pressure-temperature sensing unit for sensing the pressure and temperature of air supplied to said engine; means actuated by said sensing unit for producing an impulse signal in accordance with variations from a predetermined pressure-temperature relationship in air supplied to said engine; means for altering the flow of exhaust gases from said engine to said turbine so as to vary the pressure of air supplied to said engine; and means operated by said signal producing means for actuating said flow altering means whereby the operational speeds of said turbine and compressor are controlled so that a predetermined pressure-temperature relationship is maintained in air supply to said engine.

References Cited in the file of this patent
UNITED STATES PATENTS

| | | |
|---|---|---|
| 2,376,143 | Edwards et al. | May 15, 1945 |
| 2,403,398 | Reggio | July 2, 1946 |
| 2,423,417 | Stokes et al. | July 1, 1947 |

UNITED STATES PATENT OFFICE
CERTIFICATE OF CORRECTION

Patent No. 3,096,614                        July 9, 1963

Alexander Silver et al.

It is hereby certified that error appears in the above numbered patent requiring correction and that the said Letters Patent should read as corrected below.

Column 6, line 19, for the claim reference numeral "11" read -- 3 --.

Signed and sealed this 21st day of January 1964.

(SEAL)
Attest:
ERNEST W. SWIDER

Attesting Officer

EDWIN L. REYNOLDS

Acting Commissioner of Patents